(12) United States Patent
Simone

(10) Patent No.: US 6,514,408 B1
(45) Date of Patent: Feb. 4, 2003

(54) WELDED PARTICLE CONTROL SCREEN ASSEMBLIES

(75) Inventor: Anthony D. Simone, Greensboro, NC (US)

(73) Assignee: Purolator Facet, Inc., Greensboro, NC (US)

( * ) Notice: Subject to any disclaimer, the term of this patent is extended or adjusted under 35 U.S.C. 154(b) by 0 days.

(21) Appl. No.: 09/580,071

(22) Filed: May 30, 2000

(51) Int. Cl.[7] .............................................. B01D 39/12
(52) U.S. Cl. ................... 210/323.2; 210/335; 210/457; 210/490; 210/497.01; 210/499; 210/510.1
(58) Field of Search ................. 210/338, 342, 210/457–459, 490, 496, 497.01, 499, 500.1, 510.1, 488, 489, 323.2; 166/230; 219/58, 61

(56) References Cited

U.S. PATENT DOCUMENTS

| | | | |
|---|---|---|---|
| 4,064,938 A | 12/1977 | Fast ........................... 166/236 |
| 4,434,054 A * | 2/1984 | Livesey et al. ............. 210/484 |
| 4,821,800 A | 4/1989 | Scott et al. .................. 166/228 |
| 5,232,048 A | 8/1993 | Whitebay et al. ........... 166/228 |
| 5,411,084 A | 5/1995 | Padden ....................... 166/230 |
| 5,624,560 A | 4/1997 | Voll et al. ................... 210/486 |
| 5,642,781 A | 7/1997 | Richard ...................... 166/231 |
| 5,782,299 A | 7/1998 | Simone et al. .............. 166/230 |
| 5,899,271 A | 5/1999 | Simone et al. .............. 166/230 |
| 5,937,944 A | 8/1999 | Simone et al. .............. 166/230 |

* cited by examiner

*Primary Examiner*—Matthew O. Savage
(74) *Attorney, Agent, or Firm*—Brinks Hofer Gilson & Lione

(57) ABSTRACT

In a particle or sand screen control assembly for mounting on a base pipe used in a well, a sealing strip preferably in the form of a metal strip is used in a weld joint that joins the metal mesh screen of filter media to a solid metal structure or "safe edge". The sealing strip covers the pores in the screen proximate the metal structure to which it is welded. The sealing strip is a separate thin sheet of metal that is compatible with the welding metal used in the weld joint, such that the sealing strip becomes unitary with the weld joint. Prior to welding, the sealing strip may be bent around the screen if desired, or may lie flat along the top or bottom surface of the screen.

17 Claims, 4 Drawing Sheets

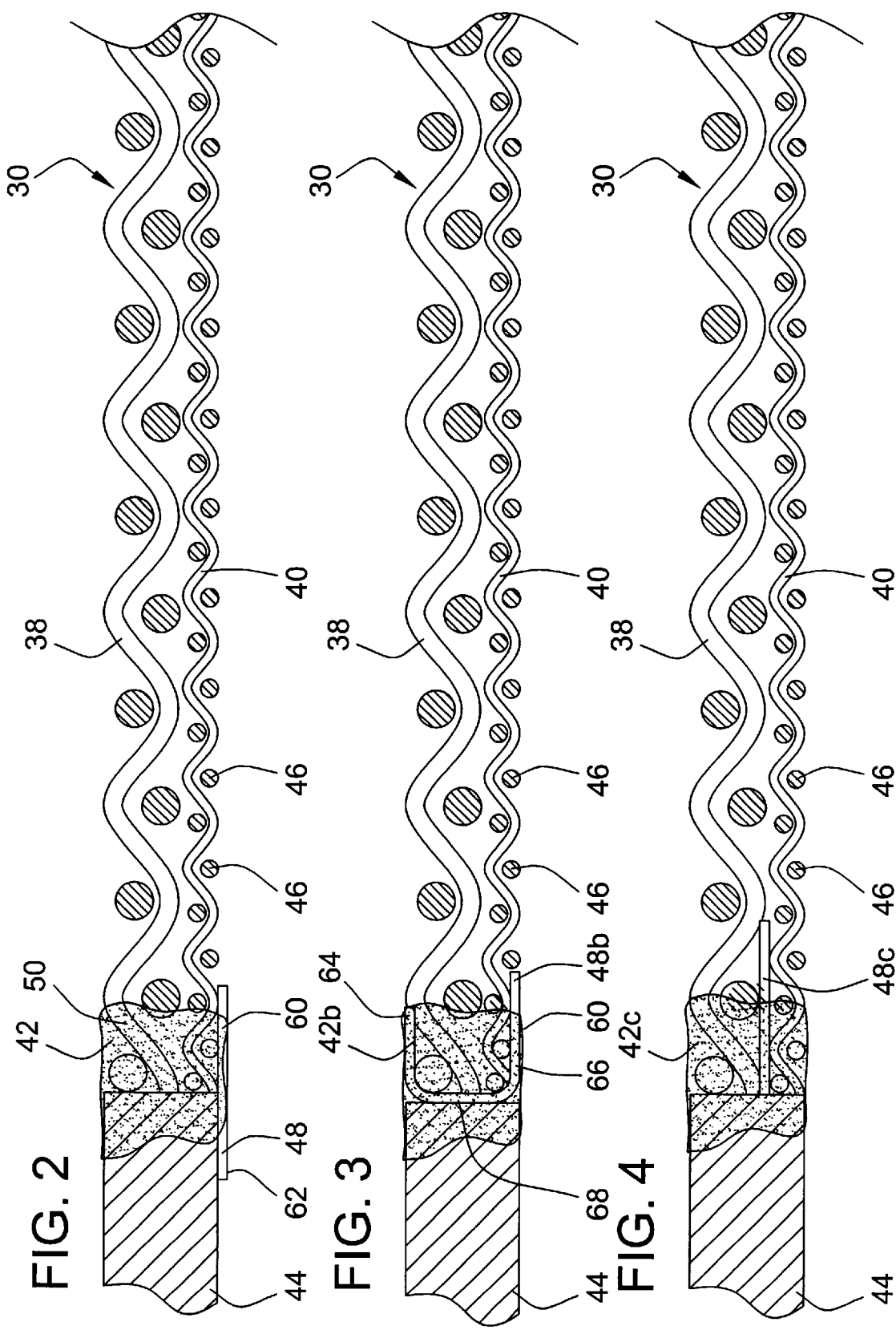

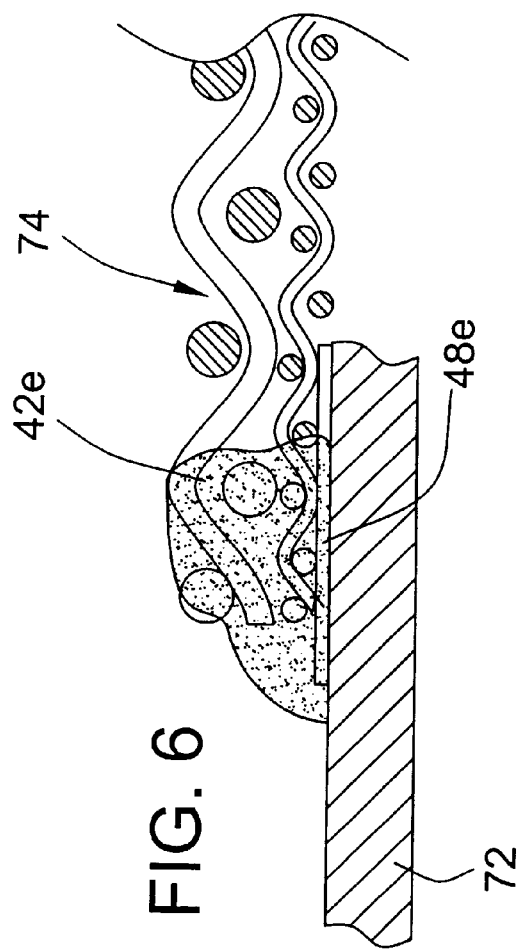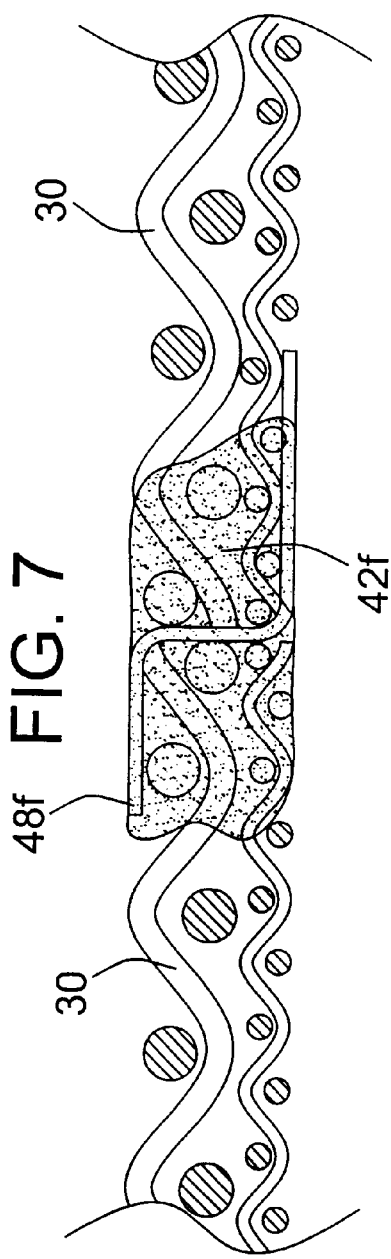

WELDED PARTICLE CONTROL SCREEN ASSEMBLIES

FIELD OF THE INVENTION

The present invention relates generally to welding processes, and more particularly to weld joints and welding processes for welding finer metal particle control screens to compatible metallic structures for control screen assemblies adapted to mount on a perforated pipe used in a well.

BACKGROUND OF THE INVENTION

It is well known to provide a particle control screen assembly for a perforated pipe used in a well, the assembly typically including at least one outer cylindrical perforated plate and at least one inner fine mesh control screen contained therein. For example, exemplary arrangements of particle control screen assemblies assembly for a perforated pipe used in a well are disclosed in U.S. Pat. Nos. 5,782,299, 5,899,271, and 5,937,944, all to Simone et al., and commonly owned by the present assignee of the instant patent application. Other arrangements of particle screen assemblies for a perforated pipe used in a well are disclosed in U.S. Pat. No. 5,411,084 to Padden, U.S. Pat. No. 5,232,048 to Whitebay, U.S. Pat. No. 4,064,938 to Fast. All six of these patents listed in the two preceding sentences are hereby incorporated by reference for the purpose of illustrating possible uses of the present invention as will later be more greatly appreciated.

In this art, it is desirable to minimize leakage of sand or other particulate into the perforated pipe for obvious reasons. As will be appreciated by those skilled in the art when viewing the present invention, the prior art attempts are deficient in minimizing leakage of sand or other particulate into the perforated pipe.

SUMMARY OF THE INVENTION

It is an objective of the present invention to further minimize leakage of sand and other particulate past particle control screen assemblies for a perforated pipe used in a well.

It has been discovered that the welding processes used in providing high strength permanent joints in particulate screen assemblies for a perforated pipe used in a well can tend to burn the thin wire material in the mesh screens due to the intense heat necessary for welding adjacent metal structures. This can occasionally result in the formation of gaps larger than the pore sizes in the screen and therefore the increased possibility of leakage of larger particles. The problem is particularly acute at weld locations between the particulate screen medium and a solid metal support structure. The present invention provides a solution to the problem through the arrangement of a sealing strip preferably in the form of a metal strip to cover the pores in the screen proximate the metal structure to which it is welded. The sealing strip ensures that large particles can not pass at locations near the weld regardless of whether or not wires of the mesh screen have been burned too extensively creating the possibility of gaps larger than the pore size of the mesh screen.

In the preferred embodiment, the sealing strip is a separate thin sheet of metal that is compatible with the welding metal used in the weld joint, and is arranged along the edge of the mesh screen prior to welding, such that the metal strip becomes integral or unitary with the weld joint. Prior to welding, the sealing strip may be bent around the mesh screen if desired, or may lie flat along the top or bottom surface of the screen.

Other object and advantages of the invention will become more apparent from the following detailed description when taken in conjunction with the accompanying drawings.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2 is an enlarged cross section of the novel weld joint illustrated in FIG. 1.

FIGS. 3–4 illustrate alternative embodiments of the weld joint of FIG. 2 shown in cross section.

FIGS. 5–7 illustrate further alternative embodiments of the novel weld joint shown in cross section but with different types and arrangements between the filter media and the metal structure to which the media is welded as compared to FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
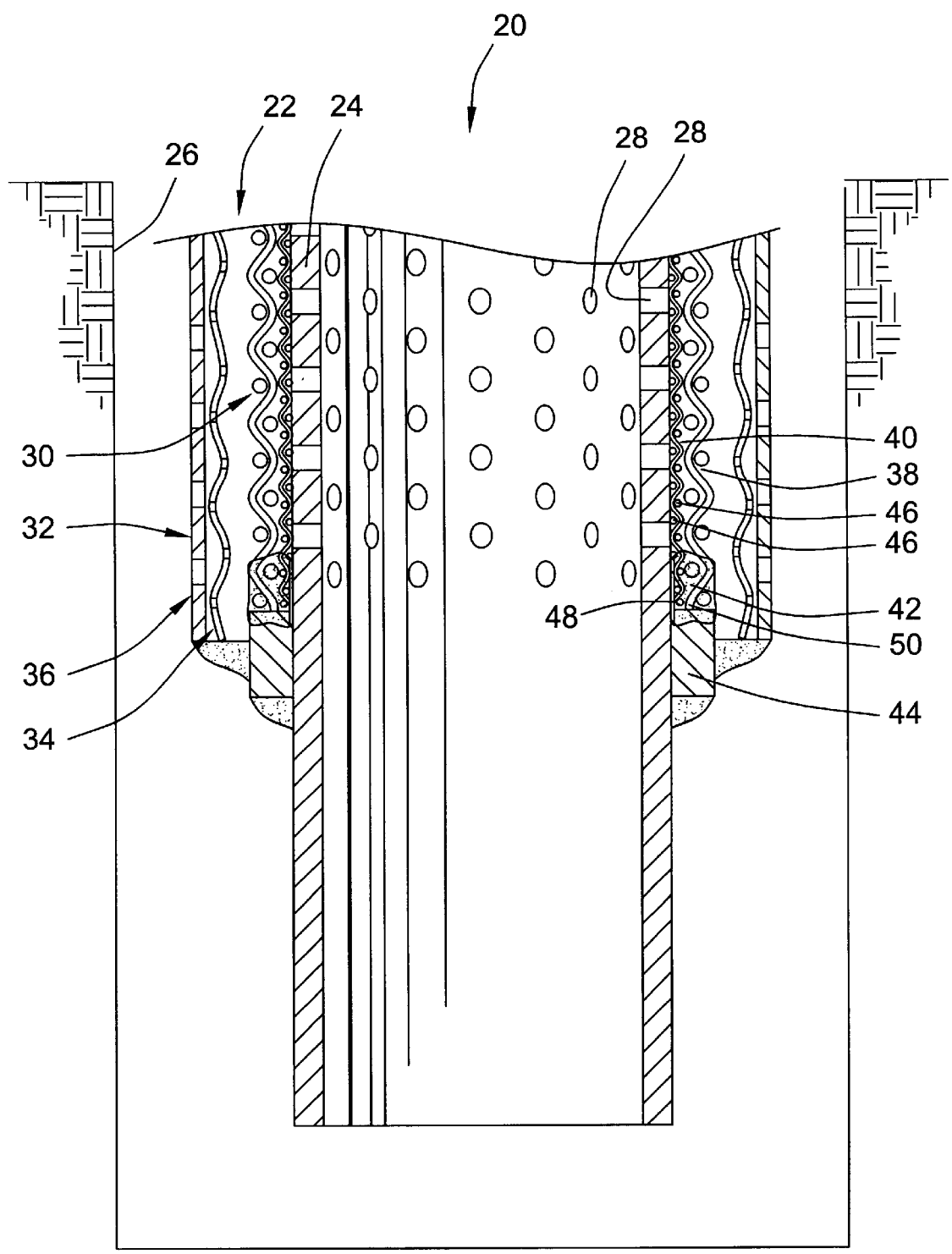
FIG. 1 is a partial cross section showing the novel weld joint in conjunction with one of the exemplary embodiments of a sand control screen assembly mounted on a base pipe in a well, according to one embodiment of the present invention.

Referring to FIG. 1, the present invention is illustrated as being incorporated into a sand or other particle filter system 20 that comprises a well screen or particle control screen assembly 22. The particle control screen assembly 22 is mounted on a base pipe 24 that is disposed, for example, in a wellbore 26. In order to draw in petroleum or natural gas from the wellbore 26, a portion of the base pipe 24 is perforated with holes 28. To prevent sand and other particles from being drawn into the base pipe 24 through such holes 28, the perforated portion of the base pipe is covered by the particle control screen assembly 22. In the illustrated embodiment illustrated in FIG. 1, the screen assembly 22 comprises a preferably multi-layer woven mesh filter media 30 surrounded by a protective wrapper 32 that includes inner and outer perforated layers 34, 36 of relatively thin metal plate material, each constructed into a cylindrical tube.

Further general details of the structural configuration of this embodiment depicted in FIG. 1 with the exception of the improved weld joint can be had with reference to U.S. Pat. No. 5,899,271, but with the understanding that the particle filter system 20 shown in FIG. 1 of this application illustrates one of the many possible configurations for sand screen assemblies. It will be appreciated by those skilled in the art that the improved weld joint and process of the present invention can be utilized various other structural configurations of particle control screen assemblies (eg. such as those disclosed in any of the aforementioned patents) where it is necessary or desirable to weld a particulate screen to another structure.

Before turning to further details of the present invention, it should be first noted that the woven mesh filter media 30 has a selected pore size to selectively prevent the inflow of certain sizes of particles through the basepipe. This filter media 30 is preferably a diffusion bonded or sintered wire mesh metal material, typically comprising stainless steel material. Exemplary filter media 30 material is commercially available from Purolator Facet, Inc. (and its predecessor Purolator Products Company), 8439 Triad Drive, Greensboro, N.C. and are sold under the trademarks PORO-PLATE® and POROPLUS®. Although the filter media 30 can be made of a single layer, it is preferably comprised of several layers of differing pore or mesh size. For example, the filter media 30 illustrated in the present embodiment includes two layers, including a coarser mesh layer 38 and a finer mesh layer 40. The present invention is also applicable to single layer or three or more layers if desired. Because the base pipe 24 is generally cylindrical, the filter media 30 is formed into a cylindrical structure. As such, the term cylindrical as used herein also is meant to include pleated filter media configurations as shown in the aforementioned U.S. Pat. No. 5,411,084.

To provide sufficient sand and particulate filtering in this application, the filter media is adapted for a perforated pipe used in a well. In particular the pores of the filter media 30 have an effective size between about 50 micron and about 250 micron such that particles larger than that in diameter do not pass, although pore sizes of up to about 500 micron may be acceptable in some well applications. It should also be noted that the cylindrical filter media has an cross sectional thickness or radial thickness of between about 0.02 inch and about 0.38 inch, preferably between about 0.05 and 0.07 of an inch. In well applications, the filter media 30 typically also has an axial length of between about 3 feet and about 10 feet. It will be appreciated that actual size ranges listed in this paragraph can vary depending upon actual well requirements.

It should also be noted that welded joints are often used in particle control screen assemblies for purposes of providing strength. In particular, the metal of the weld integrally unitizes two separate compatible metal structural components because during the welding process, the metal material in the edge portions of both structural components melts and becomes integral or unitary with the weld. The weld 42 provides a very strong joint that is able to reliably carry the axial and radial forces imparted on the filter media 30 during operation of the well.

With the foregoing in mind, it has been discovered that the welding processes used in providing high strength permanent joints in particulate control screen assemblies for a perforated pipe used in a well can create small gaps or holes sized larger than the pores in the filter media. In particular, it has been realized that achieving the strength of a weld 42 causes the filter media 30 to melt or "burn up" an undesirable amount during the welding process. Part of the reason for this is that the corresponding metal structure (shown as a "safe edge" or steel support tube 44 in FIGS. 1 and 2) to which the filter media 30 is welded is typically much more solid and does not have the thin individual screen wires 46 of the filter media 30. The result is that leakage may result in locations where the screen wires 46 have been melted too much leaving too large of gaps or holes in the screen mesh material.

In accordance with the present invention, a sealing strip is used at the screen edge and in the weld 42 that may take the form of a separate thin, solid metal strip 48. The metal strip 48 is arranged along the filter media edge 50 that is welded to metal support tube 44. The support tube 44 provides a "safe edge" that protects the filter media 30 at its end and that can in turn be welded to other structures or welded upon as desired without concern about burning up the screen wires 46 of the filter media 30. In any event, the metal strip 48 covers an axial length of the filter media 30 greater than the maximum length of screen wire 46 burn that is induced as a result of the welding process such that no holes or gaps larger than the effective pore size of the filter media 30 are formed. The support tube 44 or other metal support structure may have a radial thickness or cross sectional thickness of between about 0.02 inch and 0.38 inch, and is preferably solid. It has been found that a metal strip having a thickness of about 0.005 inch and about 0.02 inch works sufficient for this application.

The material of the weld 42 is conventional and is selected such that it is compatible with the metal of the support tube 44 (which is preferably stainless steel) and the filter media 30 (which is preferably stainless steel). The metal strip 48 which may be Inconnel type steel or stainless steel and melts during the welding process. The metals of the support tube 44 and the filter media 30, have a sufficiently similar melting point such that during the welding process the edge of the support tube 44 and the edge 50 of the filter media 30 melt and integrally bond with the weld 42 such that the weld 42 unitizes the filter media 30 with the metal support tube 44. Likewise the metal strip 48 also has a similar melting point such that the metal of the strip 48 melts and integrally bonds with the weld 42.

FIGS. 2–4 illustrate some of the various arrangements and locations for the metal strip 48, 48b, 48c relative to the weld 42, 42b, 42c in arrangements where the cylindrical support tube 44 and cylindrical filter media 30 are axially butted up against each other such that they may be welded together (the tube 44 and the media 30 having similar diameters). In the embodiment of FIG. 2, the metal strip 48 takes the form of a cylindrical ring including a first axially extending portion 60 covering the inner radial periphery of the finer mesh 40 of the filter media 30 and a second axially extending portion 62 covering the edge of the metal tube 44. In the second embodiment shown in FIG. 3, the metal strip 48b is bent at two locations to include a first cylindrical portion 64 covering the edge of the coarser mesh 38 and a second cylindrical portion 66 covering the edge of the finer mesh 40 and an intermediate radially planar portion 68 disposed between the ends of the filter media 30 and the metal tube 44. In FIG. 4, the metal strip 48c is a cylindrical member arranged between the terminating edges of the coarser mesh 38 and finer mesh 40. The metal strip 48c may also be integrally formed with or attached to either or both of the meshes 38, 40 if desired prior to the welding step. The second and third embodiments have the advantage of being able to cover any leakage holes on both the coarser mesh and finer mesh material by being in direct contact with both meshes. It should be noted that in each of these embodiments the metal strip 48 is in contact with and covers the edge of the finer mesh 40 where particulate leakage is of particular concern.

Figure 5:
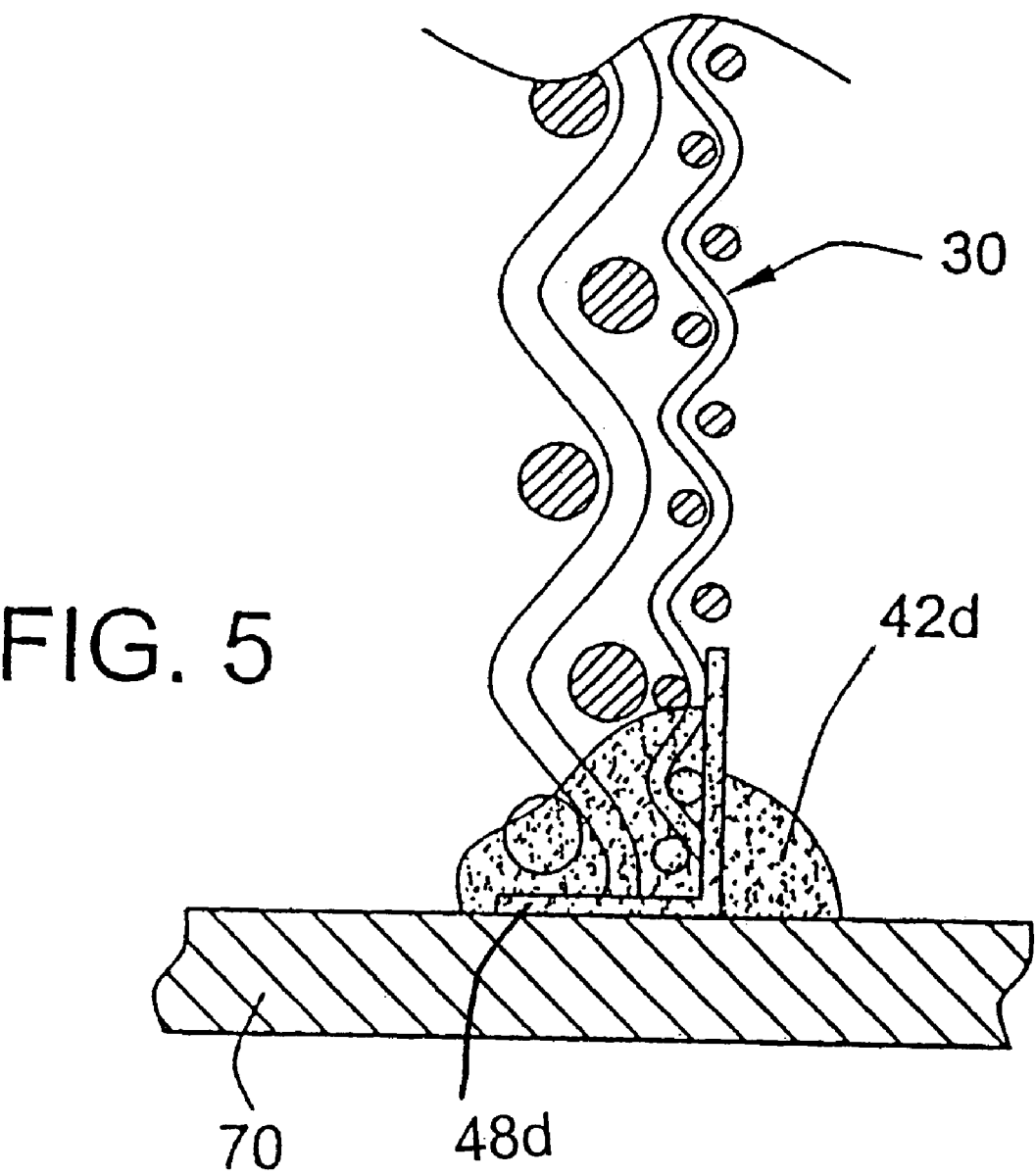

Other possible applications of the invention are illustrated in the further alternative embodiments of FIGS. 5–7. The embodiment of FIG. 5 illustrates a novel weld joint 42d at a T-Bone integrally joining a cylindrical tube of filter media 30 to a planar metal structure in the form of a end plate or disk 70. Such end plates have been used in well screens as shown in U.S. Pat. No. 5,232,048. The metal strip 48d extends axially along the edge of the filter media 30 and in contact with the finer mesh 40, and may be bent or straight. Another possible application is in overlapping or telescopically interfitting metal structures as shown in FIG. 6 wherein the tube 72 or the filter media 74 have different diameters such that end portions of the two metal structures overlap joined by weld 42e.

Other uses of the invention are also contemplated. For example, the improved weld joint of the present invention may also be used to form a seam between two edges of the filter media 30 with strip 48f and weld 42f as shown in FIG. 7, or may be used to join the filter media 30 with other metal structures such as perforated plate if desired.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A particle control screen assembly for a perforated pipe used in a well, comprising:
   a cylindrical weld-compatible metal particulate control screen generally coaxial about an axis and having pores sized to prevent passage of certain particulate material, wherein the particulate control screen is a multi-layer woven and sintered together stainless steel mesh;
   a cylindrical weld-compatible metal structure generally coaxial about the axis adjacent to a cylindrical edge of the metal particulate control screen;
   an imperforate annular sealing strip of a weld-compatible metal arranged along the cylindrical edge of the metal particulate control screen; and
   an annular metal weld between the metal particulate control screen and the metal structure with the metal weld bonding to a portion of the metal structure, a portion of the metal particulate control screen and a portion of the annular sealing strip, such that no leakage gaps larger than the size of the pores are formed.

2. The particle control screen assembly of claim 1 wherein the pores of the particulate control screen have a size between about 50 micron and about 500 micron.

3. The particle control screen assembly of claim 1 wherein the pores of the particulate control screen have a size between about 50 micron and about 250 micron.

4. The particle control screen assembly of claim 1 wherein-the particulate control screen has an axial length of between about 3 feet and about 10 feet.

5. The particle control screen assembly of claim 1 wherein the particulate control screen has a cross sectional thickness of between about 0.02 inch and about 0.38 inch.

6. The particle control screen assembly of claim 1 wherein the sealing strip has a thickness of between about 0.005 inch and 0.20 inch.

7. The particle control screen assembly of claim 1 wherein the metal structure and the particulate control screen axially butt up against each other, and wherein the sealing strip is cylindrical having a first portion covering the edge of the particulate control screen and a second portion covering an edge of the metal structure adjacent the particulate control screen.

8. The particle control screen assembly of claim 1 wherein the sealing strip includes a first portion unitary with the weld and an unmelted second portion extending axially to cover pores in screen assembly.

9. The particle control screen assembly of claim 1 wherein the metal structure and the sealing strip are non-porous.

10. The particle control screen assembly of claim 1 wherein the pores of the particulate control screen have a size between about 50 micron and about 250 micron, the particulate control screen has an axial length of between about 3 feet and about 10 feet, and the particulate control screen has a cross sectional thickness of between about 0.02 inch and about 0.38 inch, such that the particulate control screen is adapted for a perforated pipe used in a well.

11. A particle control screen assembly for a perforated pipe used in a well, comprising:
   a first cylindrical weld-compatible metal particulate control screen generally coaxial about an axis and having pores sized to prevent passage of certain particulate material;
   a second cylindrical weld-compatible metal particulate control screen generally coaxial about an axis and having pores sized to prevent passage of certain particulate material, wherein the second particulate control screen coaxially surrounds the first particulate control screen to provide a multi-layer particulate control screen, land wherein the second particulate control screen has a coarser pore size than that of the first particulate control screen;
   a cylindrical weld-compatible metal structure generally coaxial about the axis adjacent to a cylindrical edge of at least one of the metal particulate control screens;
   an imperforate annular sealing strip of a weld-compatible metal arranged along the cylindrical edge of at least one of the metal particulate control screens; and
   an annular metal weld between the first particulate control screen, the second particulate control screen and the metal structure, such that the metal weld bonds to a portion of the metal structure, a portion of the first particulate control screen, a portion of the second particulate control screen and a portion of the annular sealing strip, such that no leakage gaps larger than the size of the pores are formed.

12. The particle control screen assembly of claim 11 wherein the particulate control screens have axial lengths of between about 3 feet and about 10 feet.

13. The particle control screen assembly of claim 11 wherein the particulate control screens have cross sectional thicknesses of between about 0.02 inch and about, 0.38 inch.

14. The particle control screen assembly of claim 11 wherein the sealing strip has a thickness of between about 0.005 inch and 0.20 inch.

15. The particle control screen assembly of claim 11 wherein the metal structure and at least one particulate control screen axially butt up against each other, and wherein the sealing strip is cylindrical having a first portion covering the edge of at least one particulate control screen and a second portion covering an edge of the metal structure adjacent the at least one particle control screen.

16. The particle control screen assembly of claim 11 wherein the sealing strip includes a first portion unitary with the weld and an unmelted second portion extending axially to cover pores in screen assembly.

17. The particle control screen assembly of claim 11 wherein the metal structure and the sealing strip are non-porous.

* * * * *

UNITED STATES PATENT AND TRADEMARK OFFICE
CERTIFICATE OF CORRECTION

PATENT NO. : 6,514,408 B1
DATED : February 4, 2003
INVENTOR(S) : Anthony D. Simone It is certified that error appears in the above-identified patent and that said Letters Patent is hereby corrected as shown below:

Column 5,
Line 53, delete "wherein-the" and substitute -- wherein the -- in its place.

Column 6,
Line 26, after "screen," delete "land" and substitute -- and -- in its place.
Line 48, immediately after "about" delete "," (comma).

Signed and Sealed this

Twenty-second Day of June, 2004

JON W. DUDAS
*Acting Director of the United States Patent and Trademark Office*